(12) United States Patent
Peterson et al.

(10) Patent No.: US 6,329,439 B1
(45) Date of Patent: Dec. 11, 2001

(54) EXTRUSION OF A FOAMABLE MELT CONSISTING OF MIXED POLYOLEFIN AND RUBBER COPOLYMER

(75) Inventors: Duane E. Peterson, Copley, OH (US); Antonius Van Meesche, Rixensart (BE)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/674,767
(22) PCT Filed: May 10, 1999
(86) PCT No.: PCT/US99/10220
§ 371 Date: Dec. 27, 2000
§ 102(e) Date: Dec. 27, 2000
(87) PCT Pub. No.: WO99/58314
PCT Pub. Date: Nov. 18, 1999

Related U.S. Application Data
(60) Provisional application No. 60/084,948, filed on May 11, 1998.

(51) Int. Cl.$^7$ ................................................. C08J 9/34
(52) U.S. Cl. ..................... 521/51; 428/335; 428/339; 521/134; 521/139; 521/140; 521/79; 521/81; 264/45.5; 264/45.9; 264/46.1
(58) Field of Search ............... 521/51, 134, 139, 521/140, 79, 81; 428/339, 335; 264/45.5, 45.9, 46.1

(56) References Cited

U.S. PATENT DOCUMENTS

| | | | |
|---|---|---|---|
| 4,363,849 | * 12/1982 | Paisley et al. | 521/51 |
| 4,712,989 | * 12/1987 | Schiesser | 425/114 |
| 5,393,796 | * 2/1995 | Halberstadt | 521/134 |
| 5,532,055 | * 7/1996 | Igarashi et al. | 521/51 |
| 5,723,507 | * 3/1998 | Markovich et al. | 521/51 |
| 6,103,153 | * 8/2000 | Park et al. | 521/51 |

* cited by examiner

Primary Examiner—Morton Foelak
(74) Attorney, Agent, or Firm—Alfred D. Lobo; William A. Skinner

(57) ABSTRACT

A tapered stepped land having a choked funnel section which terminates in a lateral longitudinal section results in the formation of a foamed extrudate of a vulcanized blend of polyolefin and rubber which is a mass of closed cells having a specific gravity in the range from about 0.1 to 0.5 and the cells are sheathed in a dense non-porous, smoothly continuous skin which is formed integrally with the extrudate. The dense skin makes it possible to deposit a thin slip-coating of a low friction material longitudinally upon a chosen portion of the surface. An extruded weatherseal for the glass of an automobile's window has the slip-coating deposited as a thin film on a contacting strip of a surface which is in contact with the glass.

8 Claims, 2 Drawing Sheets

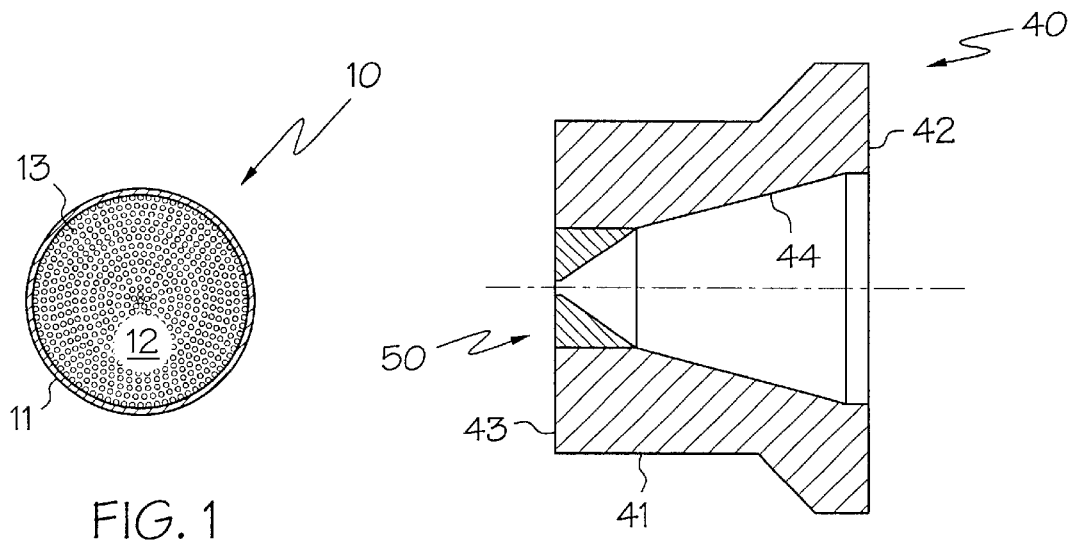
FIG. 1
FIG. 4
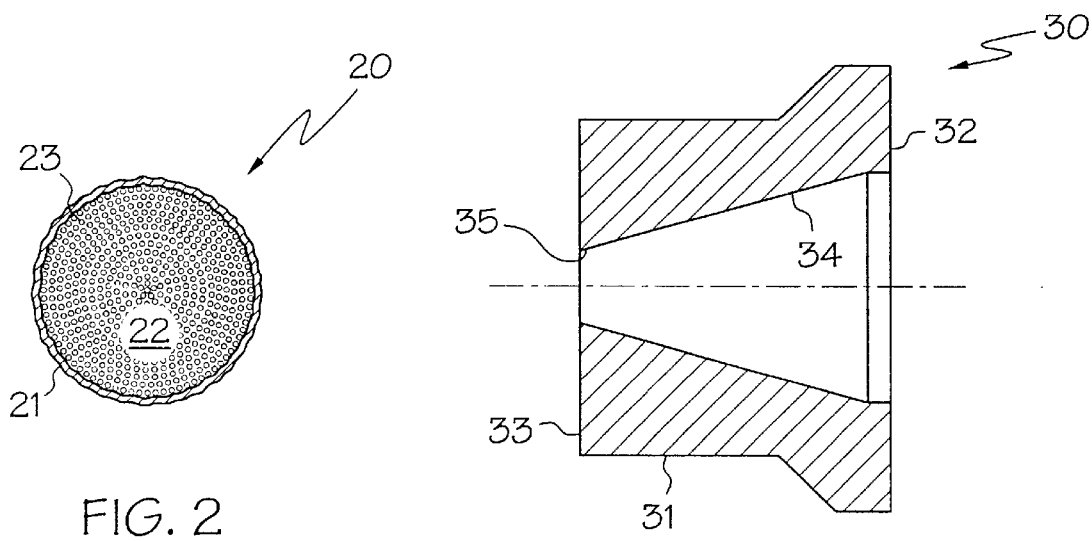
FIG. 2
FIG. 3

EXTRUSION OF A FOAMABLE MELT CONSISTING OF MIXED POLYOLEFIN AND RUBBER COPOLYMER

CROSS-REFERENCE TO RELATED APPLICATIONS

This application is filed subsequent to provisional application No. 60/084,948 filed on May 11, 1998.

FIELD OF THE INVENTION

This invention relates to particular extrusion dies which are specifically designed for a multi-zone barrel of a screw extruder to extrude a molten thermoplastic synthetic and/or natural resinous material mixed with a chemical (that is, not "physical" which produce gas by a phase change, e.g. water) blowing agent to form a foam extrudate of arbitrary cross-section, and to a process for extruding a novel smooth-skinned foam, closed-cell, extrudate with a substantially non-porous skin integrally formed in situ.

BACKGROUND OF THE INVENTION

Dies used to extrude a foamed thermoplastic polymer in a long-barrel extruder (barrel length "L":barrel diameter "D" at least 24:1) to form an article of arbitrary length and cross-section are not subjected to the high forces to which dies are subjected when either a solid or a molten metal is extruded. In the latter "metal extrusion dies", the major consideration is strength which must be sufficient to withstand forces high enough to distort or crack a die. Particularly in "foam extrusion dies" to form an extrudate having a density of less than about 0.48 gm/cm$^3$ (30 lb/ft$^3$), the major consideration is control of a mixture of particulate thermoplastic and blowing agent in the melt composition, temperature and pressure in the barrel of an extruder, the rate at which the extrudate is formed relative to the capacity of the barrel, and control of the conditions to which the melt is subjected due to the geometry of the die, all towards the specific goal of producing a smooth surface on an extrudate with reliably reproducible dimensions. Because it was believed that narrowly controlled laminar flow was essential to produce an acceptable extrudate, a conventional die is provided with a tapered land, preferably tapered so as not to change the direction of flow of the melt. It was also believed that a land length was to be short enough to minimize pressure drop and premature foaming but long enough to withstand system pressures and form the desired profile thoroughly.

The foregoing is stated in U.S. Pat. No. 5,654,346 to Halberstadt et al who found that a flat plate is an effective substitute for a die with a tapered land particularly for extrusion of a foam having a density of less than about 0.32 gm/cm$^3$ (20 lb/ft$^3$) derived from a "soft" thermoplastic resin, namely one having a Shore A hardness of less than 72. The evidence is that a soft thermoplastic resin is effectively extruded through an orifice profiled in a flat plate, but a "hard" thermoplastic resin having a Shore A hardness greater than 72, requires a die with a tapered land.

It is desirable to provide a die with a design which produces a substantially smooth-surfaced extrudate having an accurately defined cross-section irrespective of the hardness of the thermoplastic resin, and particularly of a resin which is a vulcanizable blend of from 10 to 50 parts by weight ("wt"), preferably 20 to 50 parts by wt, of a crystalline a-olefin polymer having a repeating unit with from 2 to 4 carbon atoms, and from 90 to 50 parts by weight, preferably 80 to 50 parts by wt of a rubber copolymer, as exemplified by commercially available Santoprene® resins.

Theoretical considerations in TPV (thermoplastic vulcanizate) extrusion are set forth in "Analysis of TPV Extrusion Chemical Foaming Process" by Wang et al in a paper presented at the Fall Meeting in Proceedings of the American Chemical Society Division of Polymeric Materials: Science and Engineering on Aug. 23–28, 1998. It is stated that "Premature foaming inside the die will destroy or damage the cell structure resulting in higher foam density and bad foam surface. In principle, the bubble growth process should be postponed to a point as close to the die exit as possible. This can be achieved by designing the die with a sharp converging angle and short land length."

It is particularly desirable to extrude a weatherseal having a low-friction surface, irrespective of its roughness or smoothness (Ra) as measured with a model EMD-0400-W5 Surfanalyzer with a stylus having a radius 0.0001" and with a stylus force of 200 mg, for use in an application where a glass surface is moved back and forth over the extrudate. Such weatherseal against which the window glass of an automobile door slides up and down is generally formed of a soft synthetic resinous vulcanizate which is provided with a fiber nap such as a nylon nap on the glass-abutting surface along which the glass is to be slidably translated. An alternative is to adhesively secure a low-friction tape of a synthetic resin such as polytetrafluoroethylene (PTFE). As stated in the '655 patent, neither alternative is satisfactory; fiber napping is complicated and the nap is short-lived; and coating the appropriate surfaces with adhesive to which the PTFE tape is to be attached is both complicated and unsatisfactory as the tape is to be secured on a curved surface and around corners.

The crystalline polyolefin is either a homopolymer of an α-olefin having from 2 to 4 carbon atoms, or a copolymer of two or more of such α-olefins. Preferred are polyethylene (PE) or polypropylene (PP), although copolymers of either ethylene or propylene with a minor amount of a higher alpha olefin can be used. Polypropylene is most preferred. The crystalline nature of the polyolefin provides desirable properties such as high tensile strength and thermoplasticity to the blends, Rubbers useful in the foamed blends include butyl rubber, halobutyl rubber, EPDM (ethylene/propylene/diene rubber) and EPR (ethylene/propylene rubber) rubber, acrylonitrile/butadiene rubber (NBR) and natural rubber. Combinations of two or more rubbers of different types can also be used. Thermoplastic elastomers which can be successfully foamed by the process of the invention are described in the following U.S. patents, the disclosures of which are herein incorporated by reference: U.S. Pat. Nos. 4,104,210; 4,130,534; 4,130,535; 4,299,931; and 4,311,628; inter alia. Also useful are blends of crystalline polyolefin plastics and partially cured rubbers, such as those described in U.S. Pat. Nos. 3,806,558 and 3,862,056, and blends of crystaline polyolefins and uncured EPR or EPDM rubber. The term "elastomer" is used herein to refer to a vulcanized blend of polyolefin and rubber which may be formulated to exhibit varying degrees of elasticity such that a test strip 2.5 cm wide and 2.5 mm thick may be stretched in the range from about 5% to 100% of its initial length and still return to it; further, such vulcanized elastomer is necessarily thermoplastic and re-processable. Typically, a relatively soft, flexible product is desired, so the softer grades of elastomer are preferred, which have high ratios of rubber to polyolefin, such as from 65:35 up to 85:15. The elastomers can optionally contain other ingredients, including oils, waxes, fillers, colorants, antidegradants and the like.

It is preferred that the rubber be at least partially cured, and more preferred that it be fully cured without using a sulfur curative. Preferred curatives for the elastomers of this process are peroxide curatives or phenolic resin curatives, with the latter being especially preferred. Zinc oxide is an effective curative for halobutyl rubbers. The phenolic curative system includes a methylolphenolic resin and an activator. The activator is preferably a Lewis acid. Thermoplastic elastomers of the preferred type are described in detail in U.S. Pat. No. 4,311,628.

Commercial thermoplastic elastomers which are effective in the process of the invention include those which are manufactured and sold by Advanced Elastomer Systems, L.P., under the registered trademarks TREFSIN, SANTOPRENE, GEOLAST, VYRAM, and TPR; by DSM under the registered trademarks SARLINK; and by others.

Also effective when dynamically vulcanized with the foregoing TPEs, are rubbery polymers such as copolymers of ethylene and vinyl acetate; and copolymers of a diene and a vinyl aromatic such as copolymers of styrene and butadiene, as exemplified by commercially available Kraton® rubbers. Such rubbery polymers may be tumble-blended with a chosen TPE in an amount in the range from about 5% to 20% by wt of the tumble-blended mixture.

The foregoing elastomers are used to form the extrudates in the '346 and the '889 patents inter alia, but the conditions for extrusion, particularly the rate of extrusion (mass flow of melt) relative to the capacity of the barrel of the multi-zone extruder, are not specified; nor is the condition of the surface, though stated as being smooth. Smoothness is of particular importance in weather stripping and window-glass both of which require a smooth, non-undulating or non-wavy surface; a wavy surface does not provide a seal against incoming air or water. A desirably smooth surface having a roughness less than 300 Ra is not obtained with a foamed extrudate of the above composition having a density less than 30 lb/ft3 because it is conventionally produced in a multi-zone extruder with a temperature profile described in U.S. Pat. Nos. 4,898,760; 5,788,889 and the '346 patent inter alia, that is, the temperature in the feed zone is lower than that in the discharge zone near the die (referred to as a "low-to-high temperature profile", shown in Table I of the '346 patent to be 160° C. (320° F.) and 185° C. (365° F.) respectively. As is well known, a higher melt temperature near the feed hopper than the temperature near the die, tends to plug the barrel due to build-up of melt (see Encyclopedia of Polymer Science and Engineering Vol 1, pg 54) prematurely plugging the throat of the machine.

Further since surface is to a large extent a function of composition and density of the extrudate, it is essential to specify the composition which provides a surface with particular characteristics. A smooth bearing-surface, sufficiently smooth to allow the glass of an automobile window to be retracted into the door and raised into a position sealing the window, all the while in contact with the weather strip, cannot be produced directly by extruding a foam having the composition specified herein. Therefore, as shown in U.S. Pat. Nos 5,343,655; 5441,685 and 5,447,671 assigned to Tokiwa Chemical Industries, the bearing-surfaces of the weather strip are coated with a contacting layer which provides the necessary surface. Though superposing a contact layer on only the bearing surface avoids modifying a major portion of the surface of the weatherseal, thus maintaining the desirable softness of the extrudate, this is not an easy task. Since it is evident that coating the entire surface with a molten polyolefin will provide a smooth and hard bearing surface, the problem is that a coating thick enough to provide a smooth layer on a conventionally "smooth" foamed extrudate such as is used in the aforesaid patents, is typically so thick that it interferes with the flexibility and softness of the weatherseal. The smooth non-porous skin of the novel extrudate allows a molten polyolefin to be co-extruded over the entire surface of the extrudate in so thin a coating as not to adversely affect either the softness or flexibility of the weather seal, yet allow the glass to travel along the surface of the extrudate with desirable ease. Further, the dense skin allows the production of a foamed extrudate which is strong and durable despite having a density 70% less than that of the solid unfoamed elastomer.

SUMMARY OF THE INVENTION

It has been discovered that dynamically vulcanizable thermoplastic compositions of an elastomer containing no more than 50 parts by wt of polyolefin and at least 50 parts by wt of rubber per 100 parts by wt of polyolefin and rubber, may be extruded in a screw-type long-barrel extruder through a die with a stepped land which forces an angular change of direction of the melt under critically defined process conditions to produce a novel, stable substantially closed-cell foam extrudate having a density in the range from about 0.16 to 0.48 gm/cc (10 to 30 lb/ft$^3$), preferably about 0.24 to 0.4 gm/cc (15 to 25 lb/ft$^3$), most preferably from 0.32 to 0.48 gm/cc (20 to 30 lb/ft$^3$), and an essentially non-porous, thin smooth skin (referred to as a "tight-skinned foam extrudate") formed integrally with the foam and self-produced by the vulcanized blend in situ. To provide a low-friction non-porous skin, the extrudate may be co-extruded with a molten polyolefin, preferably PE or PP. The radial thickness of the skin is in the range from about 0.1 mm to about 2 mm, irrespective of the mean diameter of the extrudate, preferably 0.1 to 0.5 =m, and is visually characterized as a dense cell-free but flexible sheath around the outer surface of the extrudate.

It has also been discovered that a strong and flexible tight-skinned foam extrudate having at least 90% closed cells (referred to as an "essentially closed-cell foam") and with a density in the range from about 50% to 85% less than that of the solid unfoamed elastomer (specific gravity in the range from about 0.9 to 0.98), may be discharged from a long-barrel extruder in which the temperature in the feed zone is no lower than the temperature in its intermediate zone or its discharge zone near a die having a stepped land; the extrudate has accurately controllable dimensions which correspond in geometrical configuration to the outline of the discharge face of the die, but the mean diameter of the foam extrudate when cooled, is at least 10% greater that of the stepped land's lateral portion; the novel extrudate is formed on the condition that a blowing agent is used which is activated at relatively low-temperature to initiate bubble growth as early as possible, near the feed end of the barrel, so as to have bubbles distributed in fluid vulcanizate as it is forced into the die, and fluid vulcanizate exits from the stepped land's lateral portion after being sharply choked in the land's funnel portion, provided that the temperature of the melt in the die is the same as (referred to as a "flat temperature profile"), or alternatively, lower than that in the feed end ("hopper end") of the extruder (referred to as a "high-to-low" or "reverse temperature profile"). The mean diameter of essentially all the closed cells is in the range from about 0.01 mm to 1 mm, preferably 0.02 to 0.5 mm, their size being controllable by choice of blowing agent and the process conditions of the extrusion.

It is therefore a general object of this invention to provide a process for extruding a tight-skinned substantially closed-cell foam extrudate having arbitrary dimensions which are enlarged at least about 10% relative to those of the face of the die of a long-barrel multi-zone screw-type extruder through which a rmixture of thermoplastic vulcanizable elastomer and chemical blowing agent is melt-extruded at a predetermined rate and with a reverse temperature profile in the barrel, to produce the extrudate having an essentially non-porous continuous skin coated along continuously sheathing the periphery of the foamed cross-section.

It is a specific object of this invention to produce a tight-skinned, closed-cell foam extrudate having an essentially non-porous skin having a smooth surface essentially free of ripples or waves which are visible to the naked eye, the surface having a roughness or smoothness in the range from about 100 to 300 Ra, preferably from 150 to 250 Ra. For comparison, a rectangular parallelpiped dynamically molded in a press from a melt of the elastomer defined herein, against a polished SPE Class 3 metal surface, produces a skin with a smoothness of Ra 17.

It is another specific object of this invention to provide a stepped land having a choked funnel portion with a critical conical angle (apex) $\theta$ (theta) in the range from about 60° to about 120°, preferably about 90°, and a lateral portion in which the ratio of its mean diameter to its lateral length is in the range from 3:1 to 1:3, provided further that the length of the lateral land is in the range from about 0.61 mm (0.025 inch) to about 5 mm (0.20 inch), preferably 1.225 mm (0.05 inch) to about 2.54 mm (0.10 inch), irrespective of the dimensions of the choked funnel portion of the stepped land which is disposed at the discharge end of a conventional tapered die.

It is another specific object of this invention to provide a weatherseal for the window of an automobile or the like, the weatherea having a surface in the above-defined roughness range where it is coated with a slip-coating non-adhesively bonded to the non-porous sldn on the surface of the extrudate; because the slip-coating is non-adhesively self-bonded to the non-porous skin on the surface of the extrudate, the slip-coating is uniform, less than 1 mm thick and continuous; the slip-coating is a low-friction material such as a polyolefin or nylon film coated on a predetermined portion glass-contacting surface of a longitudinal weatherseal, the thickness of the film being insufficient to adversely affect either the softness or the flexibility of the weatherseal which provides a coefficient of friction in the range from about 0.3 to about 0.8.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 1 is a diagrammatic cross-section of a cylindrical novel extrudate produced in a long-barrel extruder with a reverse temperature profile and using a die having a stepped land.

FIG. 2 is a diagrammatic cross-section of a cylindrical extrudate produced in an extruder with a reverse temperature profile but using a conventional tapered land in a conventional die, all process conditions being the same as for the extrudate illustrated in FIG. 1.

FIG. 3 is a diagrammatic cross-section of a die with a tapered land used in a conventional extruder.

FIG. 4 is a diagrammatic cross-section of a die with a stepped land used in combination with a conventional die of a extruder.

DETAILED DESCRIPTION OF PREFERRED EMBODIMENTS

Figure 6:
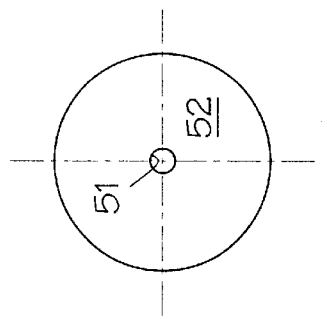
FIG. 6 is a detail end view of the stepped land.

Production of a thin-skinned foam extrudate having a specific gravity less than 0.48 is not limited by the Shore A hardness of the solid unfoamed elastomeric vulcanizate but by its polyolefin (PO) content which is to be no more than equal (by wt) to the weight of rubber in the blend, and preferably the PO is in a minor proportion by weight. Most preferred is a rubber copolymer of at least one $\alpha$-olefin and a diene, exemplified by EPDM. Vulcanized non-foamed TPEs useful to produce foam have a hardness in the range from about Shore A 45 to 80. The foamed extrudate has good resistance to compression set so as to be well suited for use as a weatherseal. Compression set resistance refers to the ability of the elastomer to resume its initial shape after being subjected to a compressive load. The extrudate is typically formed in a long-barrel extruder having a L/D in the range from about 24:1 to 60:1, fitted with a screw which provides a compression ratio greater than 2.5:1, and substantially constant pressure on the melt within the barrel, though the extrudate may also be produced in a tandem extruder. Sufficient pressure, in the range from about 2400 kPa (350 psi) to 8270 kPa (1200 psi), preferably from 3450 kPa (500 psi)–6890 kPa (1000 psi), is maintained in the head of the extruder to prevent bubble growth in the head and before the melt reaches the stepped land.

The blowing agent used may be any chemical blowing agent whether endothermic or exothermic provided it is activated in the feed zone of the extruder soon after it is introduced through the hopper of the extruder. For typical foam extrudate having a specific gravity in the range from about 0.25 to about 0.5, preferably from greater than 0.32 to 0.48, preferred blowing agents are Hydrocerol BIH-40E a 40% dispersion of citric acid/bicarbonate in PE; EX-127 a 20% dispersion of azodicarbonamide in PE; both from BI Chemicals; and Safoam RIC-50 a 50% dispersion of sodium salts of carbonic acid and polycarboxylic acid in PE, from Reedy International; and Unicell D-1500 from Dong Jin Chemicals. The blowing auent is used in the range from about 1 to about 10%, preferably from about 2 to 6% by wt of the vulcanizable blend, and tumble blended before being fed into the hopper. Though it is known that the rapid diffusion of $CO_2$ generated by bicarbonate makes production of a stable closed-cell foam extremely difficult (see Encyclopedia of Polymer Science and Engineering, Vol 2, pg 439) it is believed that the combination of the reverse temperature profile and the stepped land overcomes the difficulty.

Referring to FIG. 1 there is shown a cylindrical cross-section of an essentially closed-cell extrudate referred to generally by reference numeral 10, showing an outer skin 11 sheathing the core 12. The extrudate is produced with Santoprene® 201-64 (Shore A 64), a blend of about 30 parts of polypropylene and 70 parts of EPDM rubber which is mixed with an endothermic chemical blowing agent and dynamically vulcanized through a screw extruder having a barrel with a diameter in the range from 2.5 cm (1") to about 15 cm (6") and a L/D in the range from about 30 to 50, most preferably 30. The extruder is fitted with a die having a stepped land having a 60° conical angle, further details of which stepped land are set forth below. A flat, but preferably a reverse temperature profile is maintained in the barrel of the extruder and the fluidity of foam-generating melt is such that extrudate is typically produced in a 1.25" barrel at a rate in the range from about 1.9 Kg/hr at 36 rpm to about 6.7 Kg/hr at 120 rpm; and produced in a 2.5" barrel at a rate in the range from about 26.6 Kg/hr at 25 rpm to about 81.1 Kg/hr at 100 rpm. With a flat temperature profile the temperature in the feed zone near the feed hopper is about 177° C. (350° F.) and the temperature throughout the intermediate zones and in the discharge zone near the die, is about the same. With a reverse temperature profile, the temperature near the feed hopper is about 205° C. (400° F.) and the temperature in the discharge zone is about 170° C. (340° F.). The skin 11 is dense and has a radial thickness in the range from about 0.1 mm to 1 mm depending upon the composition of the extrudate, the overall dimensions of the extrudate and the conditions of extrusion. There are no cells visible in the skin under a magnification of 60×, and the compression set of the extrudate is in the range from about 30% to 55%, typically from 35% to 45%.

The geometry of the cross-section of the extrudate corresponds to that of the cross-sectional profile of the lateral land at the face of the die, but the dimensions of the extrudate are enlarged, the extent of such enlargement being a function of the process conditions, the rate of extrusion (screw speed, rpm), and density of the extrudate formed. For example, extruding Santoprene® 201-64 with 5% Hydrocerol® BIH-40E with a reverse temperature profile in a 1.25" diameter barrel with a die having a stepped land with a lateral land having a diameter of 0.100" and a length of 0.100", varying the screw speed produces a diameter of the cooled extrudate which is related to its specific gravity as follows:

| Run | specific gravity | diameter | rpm |
|---|---|---|---|
| 1 | 0.5 | 0.188" | 48 |
| 2 | 0.4 | 0.205" | 72 |
| 3 | 0.35 | 0.236" | 120 |

The temperature near the feed is 400° F. with successive zones being 380° F., 360° F., 340° F. and 335° F. at the die.

With 6% of the same blowing agent and same screw rpm as run 3:

| | | | |
|---|---|---|---|
| 4 | 0.23 | 0.265 | 120 |

The skin 11 is essentially non-porous, that is, it is free of pores having a mean diameter greater than 10 μm, such as may be visible to the naked eye under a magnification of 60×, and which pores could place the core 12 in open communication with the atmosphere. The core 12 consists essentially of closed cells 13, that is, cells which are not in open communication with one and another as evidenced by absorption of water. The test for determining the percentage of closed cells is as follows: a cut length of extrudate 100 cm long is weighed and submerged in water for 24 hour at atmospheric pressure, and thereafter wiped dry and re-weighed to measure the amount of water absorbed An increase of weight (water absorption) of less than 4% indicates that essentially all the cells are closed. The extrudate has a water absorption less than 2%, preferably less than 1%, typically in the range from 0.1% to 0.5% by wt.

Referring to FIG. 2 there is shown a cylindrical cross-section of an extrudate, referred to generally by reference numeral 20, produced with the same blend and blowing agent used to produce the extrudate shown in FIG. 1, in the same extruder at the same rate (screw speed, rpm) under identical processing conditions, using the game high-to-low temperature profile, and a conventional die having a tapered land with a 60° conical angle. The extrudate 20 has a porous outer skin 21 with pores visible under 60× magnification, indicating that the pores have a diameter greater than 10 μm; the cells 23 are in the same size range as those produced in FIG. 1, and are essentially all closed. The evidence is that the stepped land produces the thin smoothly continuous non-wavy, non-porous skin.

Another extrudate is formed by using only a lateral land as provided by a cylindrical bore in a die which is a flat plate 0.125" thick, as suggested in the '346 patent, with the same blend and blowing agent used to produce the extrudate shown in FIGS. 1 and 2, in the same extruder at the same rate and under identical processing conditions, using the same reverse temperature profile. The extrudate 20 has a dense, thin, non-porous but waw outer skin 21 resembling a sheathing over a rope-like core 22, with a profile such as is produced by helically twisting plural strand components into a single rope. The evidence is that the reverse temperature profile produces the thin, dense non-porous skin having multiple, random, surface undulations and indentations.

Referring to FIG. 3 there is shown a conventional tapered die referred to generally by reference numeral 30 having a die body 31 with an upstream face 32, a downstream face 33 and a conical die aperture 34 extending to the down-stream face and terminating in a tapered land 35. To form an extrudate with a desired cross-section, a profiling die plate is typically fixed to the face of the die. A long-barrel extruder may be regarded as comprising four temperature zones prior to the die. In a reverse temperature profile, with conventional TPEs, the feed zone is operated at a temperature in the range from about 205–210° C. (400–425° F.); zone 2 is operated at a temperature in the range from about 195–205° C. (380–400° F.); zone 3 is operated at a temperature in the range from about 185–195° C. (365–380° F.); zone 4 is operated at a temperature in the range from about 180–195° C. (360–380° F.); and the discharge zone near the die is operated at a temperature in the range from about 170–175° C. (340–350° F.).

Referring to FIG. 4 there is shown another die body 40 having a die body 41 with an upstream face 42, a downstream face 43 and a conical die aperture 44 extending to a stepped land formed by inserting a machined block, referred to generally by reference numeral 50.

Figure 5:
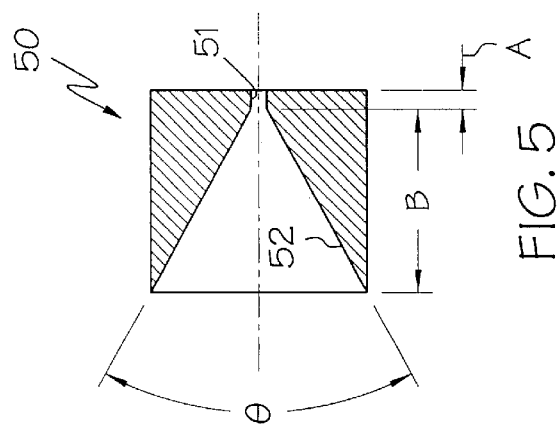
FIG. 5 is a detail side-elevational view illustrating a cross-section of the stepped land illustrated in FIG. 4.

Referring to FIGS. 5 and 6, the block 50 is provided with a stepped land including a short lateral portion 51 which has an axial length "A" and a longer funnel-shaped section 52 which has a length "B" and a conical angle θ. The length "B" is a function of the diameter of the barrel, being in the range from about 0.25 to 1.5, preferably from 0.5 to 1.0 times the diameter. For a 3.8 cm (1.5") diameter screw the funnel is preferably about 1.9 cm (0.75"). The length "A" is independent of length "B" and has the dimensions stated above. The lateral land exits the downstream face of the block. The profile of the lateral land near this face may be machined to produce a desired complex profile for a weatherseal. Alternatively, as is known in the art, an additional profiling plate, in which the upstream face is relieved to accept the expanding extrudate emerging from the lateral land, may be secured to the face of the die to produce the desired profile.

Figure 7:
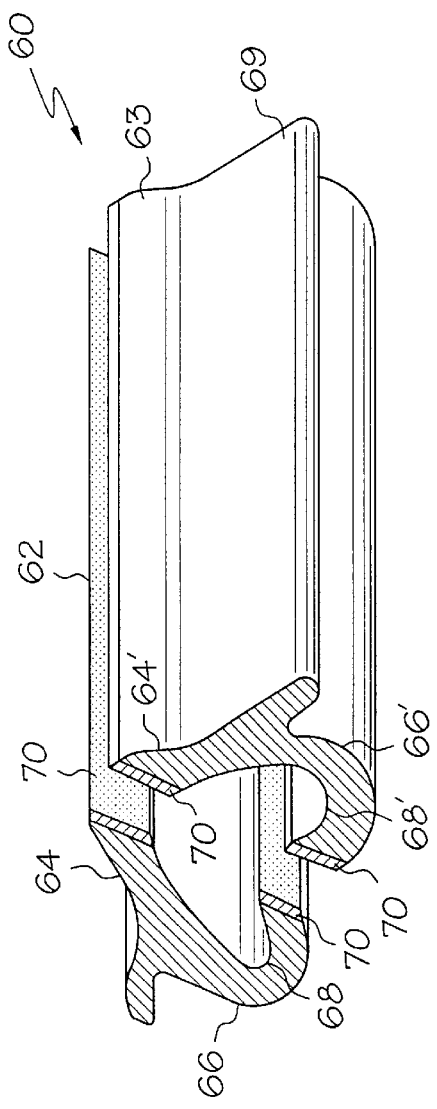
FIG. 7 is a perspective view of oppositely disposed lengths of an extrudate having a cross-section adapted to provide a weatherseal for the lower portion of a glass window which is to be raised and lowered so that inner and outer surfaces of the glass are in abutting contact with low-friction inner surfaces of each of the sections.

Referring to FIG. 7 there is illustrated a lower weatherstrip assembly 60 of a pair of extrudates 62 and 63 between which a glass window (not shown) of an automobile door is to be raised and lowered while maintairing sealing contact against the facing edges 68 of the weatherstrips. The weatherstrips are cut fromn lengths of Santoprene® 121-68W228 (Shore A 68) resin which is continuously extruded through a profiling plate secured to a die with a stepped land. Each strip is provided with upper glass-abutting portion 64, 64', intermediate portions 66, 66' each having a rib 69, 69' projecting outwardly from the side of each strip, and lower glass-abutting support portions 68, 68' which are inserted in the door's frame. A thin film 70 of PP or other low-friction non-adhesively self-bonding material is deposited on each opposed surface of the glass-abutting portions, that is, where glass-abutting portions are to contact the window glass. The film is deposited on each strip separately, by extruding the slip-coating material concurrently with the weatherseal, as a thin strip through a secondary extruder and introducing the extruded strip through an auxifiary slip-coating die which is secured to the downstream face of the profiling die.

The effectiveness of the slip-coating non-removably bonded by being deposited in a fluid molten state on the hot smooth and non-porous skin of the extrudate relies upon the characteristics of the skin for bonding. Such bonding allows coating with a slip-coating film so thin as not to interfere with the compression set and flexibility of the coated weatherseal. The thickness of the slip-coating may be in the range from about 0.05 mm to about 1 mm thick, preferably from about 0.1 mm to 0.5 mm thick. The method of depositing a slip-coating on desired surfaces of weatherseal is generally described in U.S. Pat. Nos. 4,894,289 and 5,302,463 inter alia, is well known in the art and forms no part of this invention.

What is claimed is:

1. A foamed extrudate of an elastomer formed by, extruding a mixture of an elastomer and a chenmical blowing agent in a long-barrel extruder comprising plural temperature zones including a feed zone, a discharge zone near said extruder's die, and intermediate zones, wherein said elastomer comprises a vulcanized blend of a polyolefin and a rubber copolymer, wherein said polyolefin contains a repeating unit derived from an $\alpha$-olefin having from 2 to 4 carbon atoms, and said elastomer contains no more than an equal amount by weight of said polyolefin relative to said rubber copolymer, and said chemical blowing agent is present in an amount from about 1 to 10% by weight of the elastomer;

maintaining a chosen temperature profile within said barrel wherein temperature in said feed zone is no lower than the temperature in said intermediate and discharge zones; and, discharging said extrudate from said die through a stepped land having a lateral portion having a length L' to diameter D' ratio in the range from 3:1 to 1:3, extending from a choked funnel portion having a conical angle in the range from 60° to 120° and extending longitudinally in the range from 0.25 to 1.5 times said barrel's diameter, length of said flinnel portion being measured from said upstream face to the upstream end of said lateral land portion; and, forming said extrudate with a core of essentially closed cells sheathed with a dense non-porous smoothly continuous sdin self-produced by said elastomer and formed integrally with said cells, said skin having a thickness in the range from 0.01 mm to 1 mm.

2. The foamed extrudate of claim 1 wherein the ratio of said rubber to polyolefin is in the range from 65:35 to 85:15 and said extrudate has a compression set in the range from 30% to 55%.

3. The foamed extrudate of claim 2 wherein said temperature profile is a reverse temperature profile wherein the temperature in said feed zone is higher than the temperature in said discharge zone.

4. The foamed extrudate of claim 3 wherein said blowing agent is activated in said feed zone, and a chosen longitudinal surface of said extrudate has a slip-coating of a low-friction synthetic resin deposited thereon as thin film having a thickness in the range from 0.01 mm to 1 mm without substantially affecting said compression set.

5. A process for producing a foamed extrudate of an elastomer comprising extruding a mixture of a blowing agent and a vulcanized blend of a polyolefin and a rubber copolymer, wherein said polyolefin contains a repeating unit derived from an $\alpha$-olefin having from 2 to 4 carbon atoms, in a long-barrel extruder comprising plural temperature zones including a feed zone, a discharge zone and intermediate zones, characterized by the steps comprising, mixing from 1 to 10% by weight of a chemical blowing agent with said elastomer containing no more than an equal amount by weight of said polyolefin relative to said rubber copolymer;

maintaining a temperature profile within said barrel wherein temperature in said feed zone is no lower than the temperature in said intermediate and to discharge zones; and, discharging said extrudate from said die through a stepped land having a lateral land portion having a length L' to diameter D' ratio in the range from 3:1 to 1:3, extending from a choked funnel portion having a conical angle in the range from 60° to 120° and extending longitudinally in the range from 0.25 to 1.5 times said barrel's diameter, length of said funnel portion being measured from said upstream face to the upstream end of said lateral land portion; and, forming said extrudate with a core of essentially closed cells sheathed with a dense non-porous smoothly continuous skin self-produced by said elastomer and formed integrally with said cells, said skin having a thickness in the range from 0.01 mm to 1 mm.

6. The process of claim 5 wherein the ratio of said rubber to polyolefin is in the range from 65:35 to 85:15.

7. The process of claim 6 wherein said temperature profile is a reverse temperature profile wherein the temperature in said feed zone is higher than the temperature in said discharge zone.

8. The process of claim 6 wherein said blowing agent is activated in said feed zone.

* * * * *